United States Patent

Pinel et al.

[11] Patent Number: 5,999,620
[45] Date of Patent: Dec. 7, 1999

[54] DEVICE HAVING A BASE PART, AND A COVER SELECTED FOR EXTERNAL CONFIGURATION

[75] Inventors: Marcel Pinel, Le Mans; Gilbert Brochet, Rouillon, both of France

[73] Assignee: U.S. Philips Corporation, New York, N.Y.

[21] Appl. No.: 08/981,397

[22] PCT Filed: Apr. 30, 1997

[86] PCT No.: PCT/IB97/00473

§ 371 Date: Dec. 29, 1997

§ 102(e) Date: Dec. 29, 1997

[87] PCT Pub. No.: WO97/42744

PCT Pub. Date: Nov. 13, 1997

[30] Foreign Application Priority Data

May 6, 1996 [FR] France .................................. 96 05636

[51] Int. Cl.[6] .................................................. H04M 1/00
[52] U.S. Cl. .......................................... 379/428; 379/436
[58] Field of Search .................................. 379/428, 435, 379/436, 429; 320/2; 455/90

[56] References Cited

U.S. PATENT DOCUMENTS 4,692,571  9/1987  Trinh et al. .
5,010,565  4/1991  Nash et al. .
5,659,236  8/1997  Hahn .......................................... 320/2

FOREIGN PATENT DOCUMENTS 0234037   9/1987  European Pat. Off. .
0272715   6/1988  European Pat. Off. .
0272715A1 6/1988  European Pat. Off. .
0363956   4/1990  European Pat. Off. .
0643518   3/1995  European Pat. Off. .
0659003   6/1995  European Pat. Off. .
2569508   2/1986  France .

Primary Examiner—Jack Chiang
Attorney, Agent, or Firm—Dicran Halajian

[57] ABSTRACT

An electronic device having a cover with a selected configuration, and an accessory electrically connectable to a main part. The main part has duplicate electrical connectors for use with different covers having different external configurations. The accessory makes electrical connection via a connector which is part of the cover, or is formed by pins protruding through the cover.

8 Claims, 2 Drawing Sheets

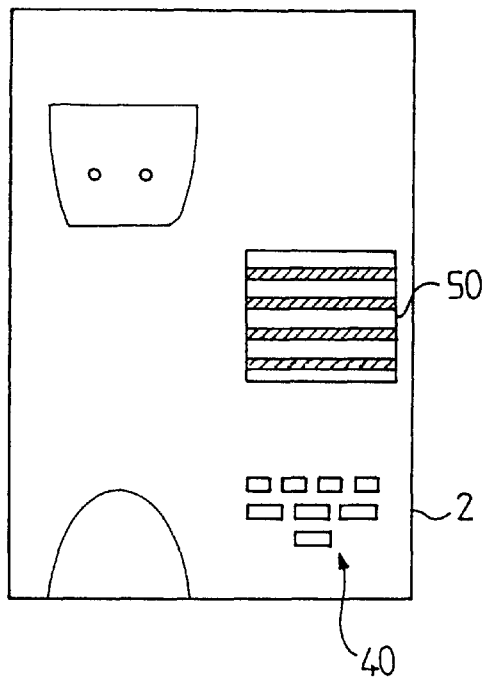
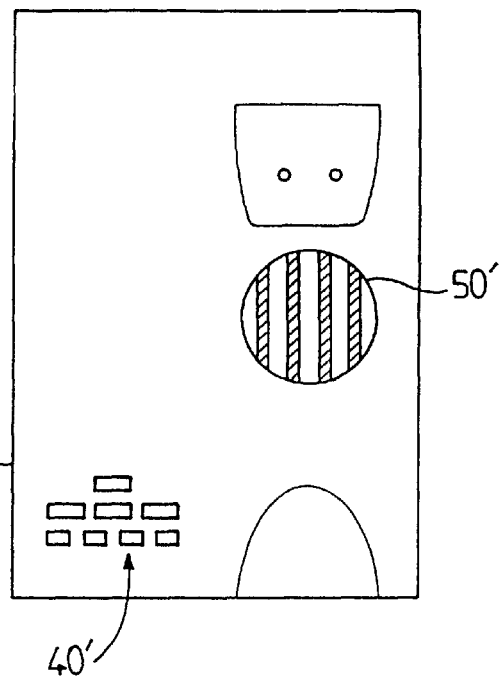
FIG. 2A        FIG. 2B
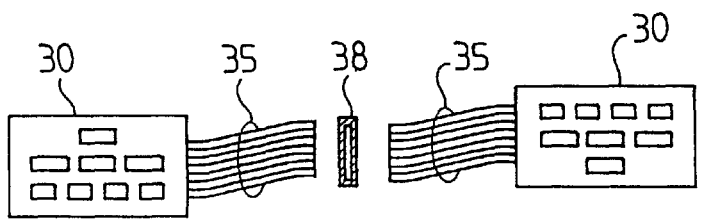
FIG. 3A        FIG. 3B

DEVICE HAVING A BASE PART, AND A COVER SELECTED FOR EXTERNAL CONFIGURATION

BACKGROUND OF THE INVENTION

The invention relates to a device showing various aspects, which device is formed by a main body and a shielding body, cover of panel having a particular one of these different aspects, or configurations and on which is placed at least one accessory that can be connected to at least one contact provided on the main body.

Such a device finds applications in the field of industrialization of products which have the same function or a similar function. One often wishes these product to show different external configurations either for commercial reasons or for reasons of adaptation. For example, a telephone set may have its handset on the left or on the right, without this resulting in too high manufacturing costs.

OBJECTS AND SUMMARY OF THE INVENTION

Such a device is known from U.S. Pat. No. 4,692,571.

The invention also relates to a telephone set or similar apparatus formed on the basis of such a device.

This known apparatus has front faces with different aspects which front faces meet on an identical connecting plate for all the faces. The only accessories provided i this known apparatus are push buttons and indicator lights.

SUMMARY OF THE INVENTION

The present invention proposes a device of the type defined in the opening paragraph for which the different aspects or configurations relate to accessories having features other than indicator lights and push buttons.

Therefore, such a device is characterized in that a given number of accessory contacts or connectors are at least in duplicate at different locations on the main body.

Thus, with the same main body which contains all the circuits ensuring the expensive functions, covers of panels can be associated thereto, which give the device these different configuration.

These and other aspects of the invention will be apparent from and elucidated with reference to the embodiments described hereinafter.

BRIEF DESCRIPTION OF THE DRAWINGS

In the drawings:

FIGS. 2A–2B shows two configurations which the device according to the invention may adopt, and FIGS. 3A–3B show an accessory to which a flexible connection means is linked.

DESCRIPTION OF THE PREFERRED EMBODIMENT

Figure 1:
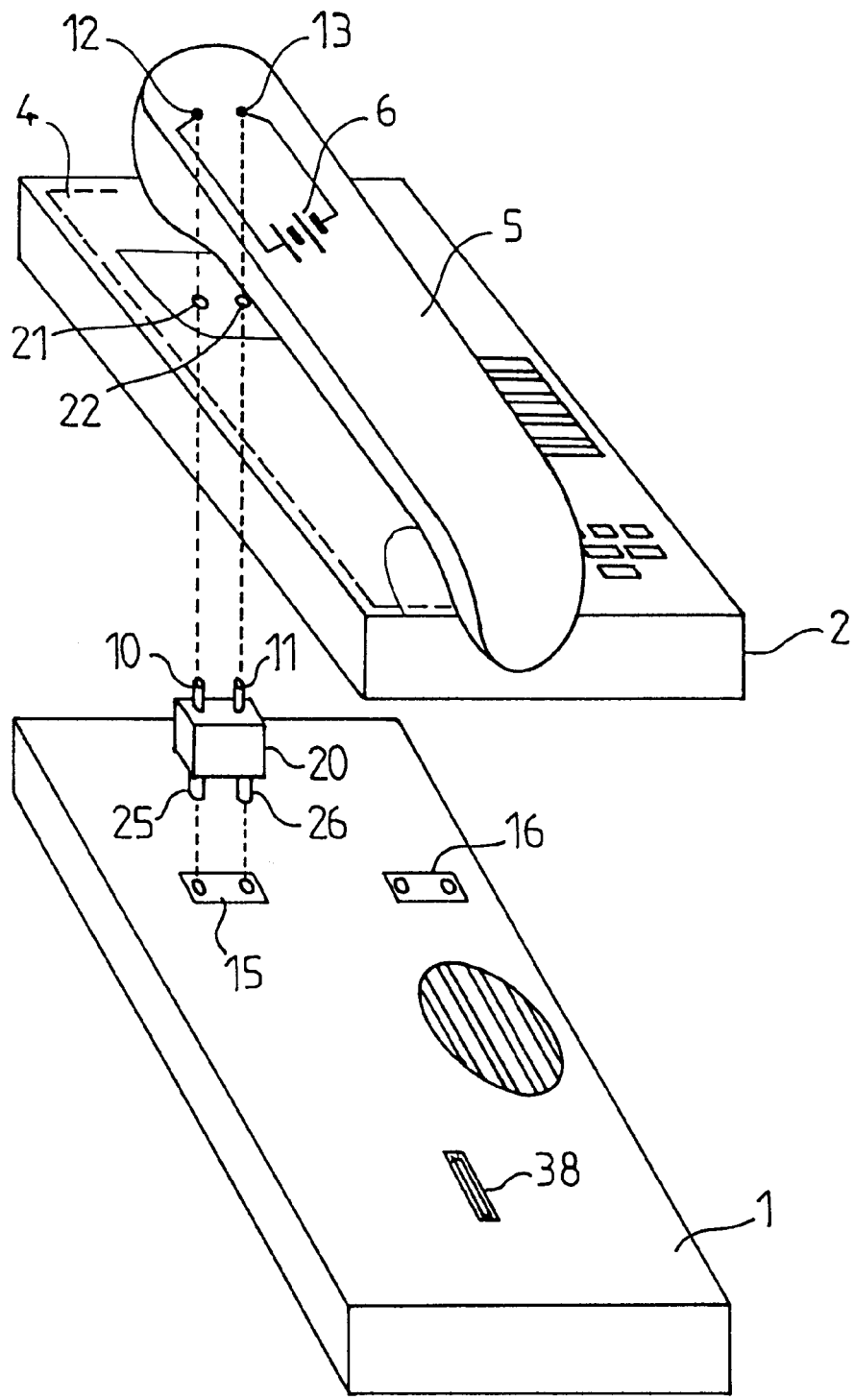
FIG. 1 shows a device according to the invention in an exploded view.

Within the framework of the described example, FIG. 1 shows a device in accordance with the invention in the form of a telephone. This telephone is formed by a main body 1 containing all the electric and electronic circuits which are necessary for its operation. A cover 2 is provided for covering the main body 1. On the cover 2 is provided a handset rest 4 shown in a dotted line for a handset 5 of the cordless type. Thus, when the handset is placed on its rest 4, the battery 6 it contains can be recharged by the electric power which is rendered accessible on the contacts pins 10 and 11 which are applied to the charging contact plates 12 and 13 provided in the handset 5.

In accordance with the invention, the contacts pins 10 and 11 can be connected to one of at least two connectors. These connectors are referenced 15 and 16 in the Figure. These two connectors 15 and 16 are connected both to a charging device (not shown in the Figures) when the main body 1 is manufactured. When the connector 15 is used, the cover is that shown in FIG. 1, or that shown in FIG. 2 in A. When it is the connector 16, the cover is that of FIG. 2 in B. Thus, with the same main body one may have two telephones showing different configurations one with the handset 5 on the left and another one with the handset on the right. Thus, the telephone may be adapted to left-hand or right-hand people.

According to one aspect of the invention, if the contacts 10 and 11 are to protrude, an intermediate element 20 can be provided. This part thus has on one side said contacts 10 and 11 which connect to the charging accesses 12 and 13 while passing through the openings 21 and 22 provided in the cover and, on the other side, contacts 25 and 26 which are capable of being plugged into the contact 15 or 16.

In addition to the handset 5, other accessories can be placed on the cover 2: for example, a keypad 30 shown in FIG. 3. This keypad 30 is connected to the main body 1 by a flexible flat cable 35 which branches off to a connector 38. The keypad 30 can thus be put on the right or on the left, without twisting the flat cable 35 too much. The keys are then turned as shown by the positions A and B in FIG. 3. The software managing the operation of this keypad is consequently to be modified. The keys of the keypad are accessible through a set of openings 40 and 40' provided in the shielding body 2 and 2' shown by A and B respectively, of FIG. 2.

Due to the invention, it is easy to have different configurations for openings for the loudspeaker via the same main body. Thus the cover 2 has a loudspeaker opening 50 in a rectangular form, whereas the cover 2' has a circular loudspeaker opening 50'.

Although a telephone has been described, it will be obvious that the invention may relate to any other apparatus which is to have different configurations for commercial reasons.

What is claimed is:

1. A device having a plurality of configurations by substitution of covers having different configurations, which device is formed by a main body and a cover having a selected configuration, the cover being arranged for electrical connection to at least one accessory that can be connected via the cover to an electrical accessory connector on the main body, characterized in that the main body comprises at least one said accessory connector at a first location, and at least a duplicate said accessory connector at a different location, said cover making electrical connection with one only of said one and said duplicate accessory connectors for providing electrical connection to said at least one accessory.

2. A device as claimed in claim 1, characterized in that said device is a telephone, said accessory being a handset.

3. A device as claimed in claim 1, comprising a flexible connection means provided between the accessory and one of said. accessory connectors to permit substitution of covers having differing accessory positions.

4. A device as claimed in claim 1, in which electrical connection to the accessory is provided by a protruding part, characterized in that the device includes an intermediate element which is electrically connected to one of said accessory connectors on the main body, said intermediate element providing electrical connection to said accessory.

5. A device as claimed in claim 4, characterized in that said device is a telephone, said accessory being a handset.

6. A device as claimed in claim 4, in which said intermediate element comprises two contact pins, said cover has two openings, and said contact pins protrude respectively through said openings for engagement with contact plates on the accessory.

7. A device as claimed in claim 6, characterized in that said device is a telephone, and said accessory is a handset on which said contact plates are arranged.

8. A device as claimed in claim 4, characterized in that said intermediate element can be connected electrically to the other of said accessory connectors on the main body for use with a different cover.

* * * * *